United States Patent
Petitpas et al.

(10) Patent No.: US 12,129,972 B2
(45) Date of Patent: Oct. 29, 2024

(54) SYSTEM AND METHOD TO COST-EFFECTIVELY PRESSURIZE CRYOGENIC H2 BY HEAT TRANSFER

(71) Applicants: Lawrence Livermore National Security, LLC, Livermore, CA (US); Gas Technology Institute, Des Plaines, IL (US)

(72) Inventors: Guillaume Petitpas, Livermore, CA (US); Kenneth Kriha, Homer Glen, IL (US); Sandeep Alavandi, Schaumburg, IL (US)

(73) Assignees: Lawrence Livermore National Security, LLC, Livermore, CA (US); Gas Technology Institute, Des Plaines, IL (US)

( * ) Notice: Subject to any disclaimer, the term of this patent is extended or adjusted under 35 U.S.C. 154(b) by 1258 days.

(21) Appl. No.: 16/512,690

(22) Filed: Jul. 16, 2019

(65) Prior Publication Data

US 2020/0025338 A1    Jan. 23, 2020

Related U.S. Application Data

(60) Provisional application No. 62/698,626, filed on Jul. 16, 2018.

(51) Int. Cl.
*F17C 5/02* (2006.01)
*F17C 7/04* (2006.01)

(52) U.S. Cl.
CPC ............... *F17C 5/02* (2013.01); *F17C 7/04* (2013.01); *F17C 2201/0109* (2013.01);
(Continued)

(58) Field of Classification Search
CPC ...... F17C 2205/0329; F17C 2205/0352; F17C 2221/012; F17C 2223/0161;
(Continued)

(56) References Cited

U.S. PATENT DOCUMENTS

| 4,399,660 A | 8/1983 | Vogler, Jr. et al. | |
| 6,276,143 B1 * | 8/2001 | Wimberley | F17C 7/02 62/50.2 |

(Continued)

FOREIGN PATENT DOCUMENTS

| CN | 111006124 A * | 4/2020 | ............ F17C 13/026 |
| KR | 20080111456 A | 12/2008 | |
| WO | WO-2011115002 A1 * | 9/2011 | ................ F17C 6/00 |

OTHER PUBLICATIONS

Translation of CN 111006124 (Year: 2020).*
(Continued)

*Primary Examiner* — John F Pettitt, III
(74) *Attorney, Agent, or Firm* — HARNESS, DICKEY & PIERCE, P.L.C.

(57) ABSTRACT

The present disclosure relates to a system for pressurizing liquid hydrogen (LH2). The system has a pressure vessel for containing an initial quantity of LH2, with the pressure vessel containing an inlet orifice and an outlet orifice. A vaporizer is used which has an inlet and an outlet. A supply tube is used to couple the outlet orifice of the pressure vessel with the inlet of the vaporizer. A discharge tube couples the discharge outlet of the vaporizer with the inlet orifice of the pressure vessel. The vaporizer receives LH2 from the pressure vessel via the supply tube during a pressurization operation, warms the LH2 using an ambient environment, and discharges heated and pressurized H2 back to the pressure vessel through the supply tube.

6 Claims, 2 Drawing Sheets

Figure 1:
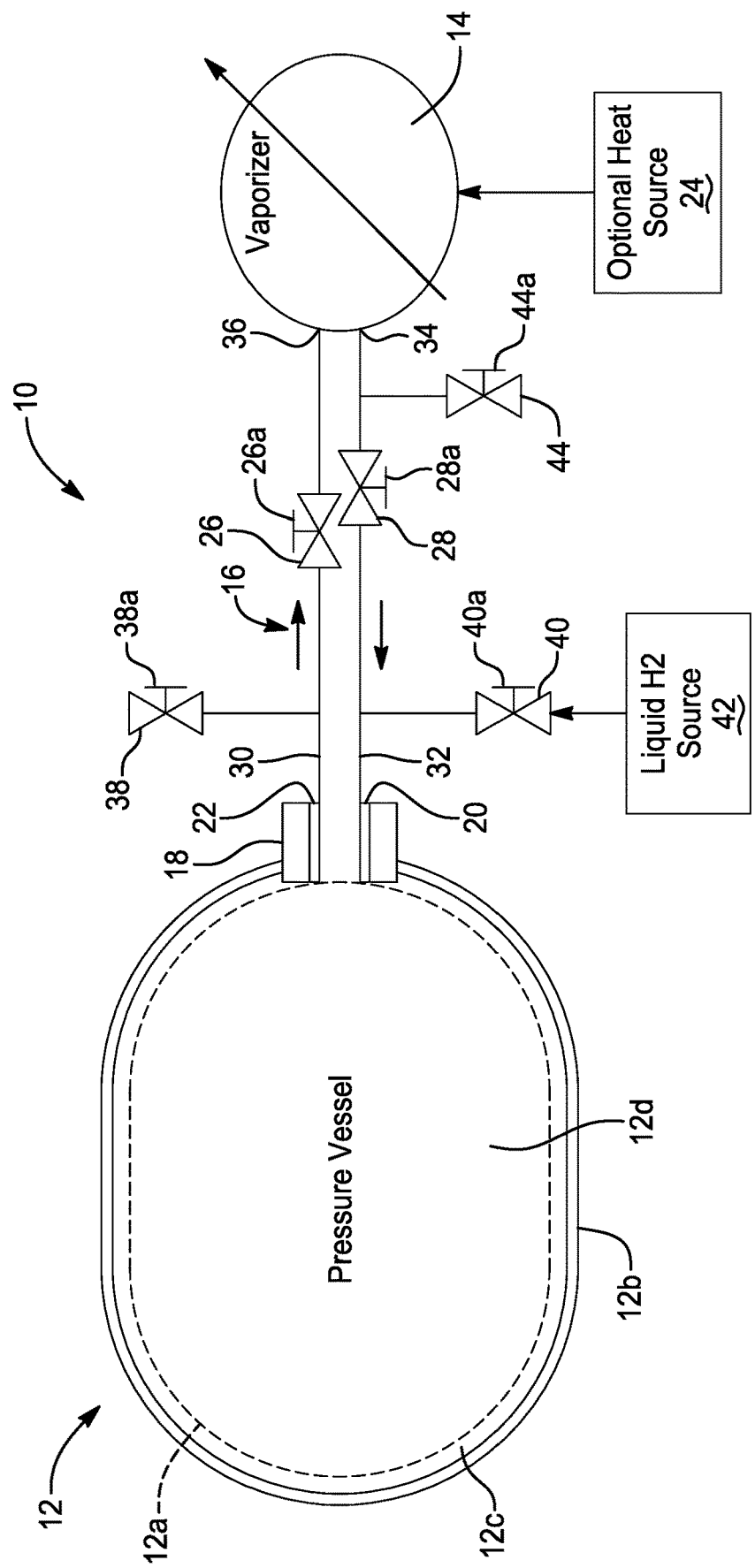

(52) U.S. Cl.
CPC .............. *F17C 2201/035* (2013.01); *F17C 2205/0323* (2013.01); *F17C 2205/0352* (2013.01); *F17C 2221/012* (2013.01); *F17C 2223/0161* (2013.01); *F17C 2227/0393* (2013.01); *F17C 2260/056* (2013.01); *F17C 2265/022* (2013.01)

(58) Field of Classification Search
CPC .......... F17C 2223/042; F17C 2223/043; F17C 2223/045; F17C 2223/047; F17C 7/02; F17C 7/04; F17C 5/02; F17C 2265/022; F17C 2260/056
USPC .................................................. 62/50.1, 50.2
See application file for complete search history.

(56) References Cited

U.S. PATENT DOCUMENTS

| | | | | |
|---|---|---|---|---|
| 7,641,068 B2* | 1/2010 | Immel | ................. | F17C 3/08 220/560.12 |
| 8,695,357 B2* | 4/2014 | Brook | ................. | F02M 21/0221 62/50.2 |
| 9,869,429 B2* | 1/2018 | Drube | ................. | F17C 7/02 |
| 2002/0189597 A1 | 12/2002 | Bingham et al. | | |
| 2003/0126867 A1* | 7/2003 | Drube | ................. | F17C 9/02 62/50.5 |
| 2008/0216487 A1 | 9/2008 | Handa | | |
| 2011/0314839 A1 | 12/2011 | Brook et al. | | |
| 2014/0096539 A1* | 4/2014 | Gustafson | ................. | F17C 7/04 62/50.2 |
| 2014/0263358 A1* | 9/2014 | Espinosa-Loza | ....... | F17C 13/06 220/560.04 |
| 2017/0030524 A1* | 2/2017 | Tilander | ................. | F17C 7/00 |
| 2018/0128210 A1* | 5/2018 | Garner | ................. | F02M 21/0215 |
| 2018/0306383 A1* | 10/2018 | Poag | ................. | F17C 7/04 |
| 2019/0248228 A1* | 8/2019 | Wallengren | .......... | F02D 19/027 |

OTHER PUBLICATIONS

International Search Report and Written Opinion in corresponding International Application No. PCT/US2019/042048 dated Nov. 6, 2019, 13 pp.

* cited by examiner

SYSTEM AND METHOD TO COST-EFFECTIVELY PRESSURIZE CRYOGENIC H2 BY HEAT TRANSFER

CROSS-REFERENCE TO RELATED APPLICATIONS

This application claims the benefit of U.S. Provisional Application No. 62/698,626 filed on Jul. 16, 2018. The disclosure of the above application is incorporated herein by reference.

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to systems and methods for pressurizing cryogenic hydrogen, and more particularly to systems and methods which enable even more efficient and maintenance free pressurization of hydrogen, by warming up a constant volume of liquid by using heat from ambient air.

BACKGROUND

This section provides background information related to the present disclosure which is not necessarily prior art.

The liquid hydrogen (LH2) path is frequently considered inefficient and expensive due to the high energy of liquefaction. However, distributing liquid H2 is very efficient and inexpensive. As a result, recent analysis has revealed that the total cost of delivering and dispensing LH2 is comparable to compressed H2 (CH2) because (1) LH2 trucks have larger capacities, reducing capital and driver cost, (2) LH2 stores at the station in inexpensive Dewars, and (3) LH2 is easier to transfer into delivery trucks. These considerations are especially important in medium and large commercial fueling stations, which can easily dispense over 500 kg of H2 per day. LH2 delivery also provides compatibility with vehicles storing cryogenic hydrogen, and CH2 can be obtained from LH2 through vaporization and subsequent compression. The advantages of LH2 distribution are illustrated in a recent California Air Resources Board (CARB) report. This report predicts future deployment of H2 fueling stations for different sources of H2 (liquid delivery, gaseous delivery, or on-site steam methane reforming (SMR)). CARB anticipates that, regardless of the rate of H2 vehicle introduction, most fueling stations will be supplied with LH2.

Ease of distribution therefore favors LH2 delivery, even when all dispensed fuel is compressed and at room temperature. In typical hydrogen fueling stations, LH2 is stored in a large Dewar, vaporized at low (near ambient) pressure, and then compressed with a compressor. A cascade charging system (typically comprising three groups of pressure vessels) helps to downsize the compressors. An optional booster compressor enables vehicle refueling at 700 bar with a lower cost cascade rated, for example, at 500 bar. A refrigeration system is typically required when dispensing 700 bar CH2 to limit heating of the vehicle vessel during rapid filling operation.

Warming up LH2 in order to pressurize it presents several challenges. First, H2 has the lowest boiling temperature besides Helium; LH2 boils at 20.3 K at atmospheric pressure while LHe boils around 4 K. Thus, any heat carrying fluid other than H2 or He would freeze and make the system impossible to operate. Second, the pressure levels often required by H2 applications are very high, up to 875 bar or above. Third, H2 is flammable, and thus heat sources need to be carefully designed. For example, electrical heating solutions have to be rated for explosive environments (Class I Division I Group B) and combustion based options should not show any potential for ignition. And last, materials in contact with H2 can be subject to embrittlement, which limits the material choice.

SUMMARY

This section provides a general summary of the disclosure, and is not a comprehensive disclosure of its full scope or all of its features.

In one aspect the present disclosure relates to a system for pressurizing liquid hydrogen (LH2). The system comprises a pressure vessel for containing an initial quantity of LH2, with the pressure vessel containing an inlet orifice and an outlet orifice. A vaporizer is included which has an inlet and an outlet. A supply tube is included which couples the outlet orifice of the pressure vessel with the inlet of the vaporizer. A discharge tube is used to couple the discharge outlet of the vaporizer with the inlet orifice of the pressure vessel. The vaporizer receives LH2 from the pressure vessel via the supply tube during a pressurization operation, warms the LH2 using an ambient environment, and discharges heated and pressurized H2 back to the pressure vessel through the supply tube.

In another aspect the present disclosure relates to a system for pressurizing liquid hydrogen (LH2). The system comprises a pressure vessel for containing an initial quantity of LH2, the pressure vessel containing an inlet orifice and an outlet orifice. A vaporizer is included which has an inlet and an outlet. A supply tube is used to couple the outlet orifice of the pressure vessel with the inlet of the vaporizer. A first valve is in communication with the discharge tube for controlling a flow of LH2 from the pressure vessel to the vaporizer. A second valve is in communication with the supply tube for controlling a flow of LH2 into the into the pressure vessel from a remote source of LH2. A discharge tube couples the discharge outlet of the vaporizer with the inlet orifice of the pressure vessel. The pressure vessel, the supply tube, the discharge tube and the vaporizer thus form a closed loop circuit. The vaporizer receives LH2 from the pressure vessel via the supply tube, warms the LH2 using an ambient environment, and discharges heated and pressurized H2 back to the pressure vessel through the supply tube.

The present disclosure still further relates to a method for pressurizing liquid hydrogen (LH2). The method comprises initially admitting an initial quantity of LH2 into a pressure vessel, and then circulating a subquantity of the LH2 into a vaporizer disposed in an ambient environment. The method further comprises using the vaporizer to warm, and thus pressurize, the LH2 to create warmed and pressurized H2. The method further includes discharging the warmed and pressurized H2 back to the pressure vessel to intermix with the LH2. When the LH2 in the pressure vessel has been sufficiently mixed with the warmed and pressurized H2 such that the pressure vessel contains only warmed and pressurized H2, then the method includes discharging the warmed and pressurized H2 via a valving system to at least one of a remote device or remote storage tank.

Further areas of applicability will become apparent from the description provided herein. It should be understood that the description and specific examples are intended for purposes of illustration only and are not intended to limit the scope of the present disclosure.

DRAWINGS

Figure 2:
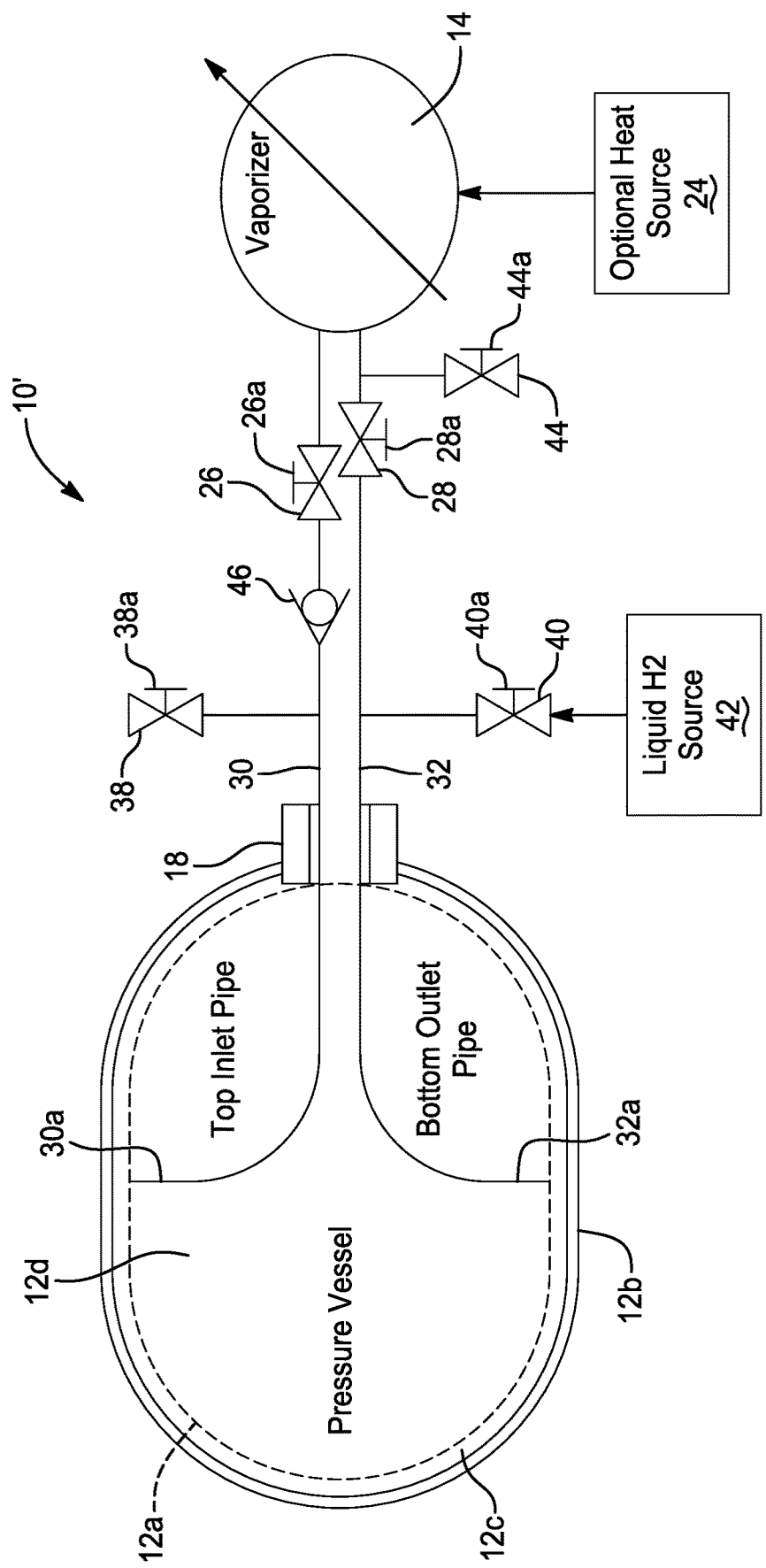

The drawings described herein are for illustrative purposes only of selected embodiments and not all possible implementations, and are not intended to limit the scope of the present disclosure. Corresponding reference numerals indicate corresponding parts throughout the several views of the drawings. In the Figures:

FIG. 1 is a high level block diagram of one embodiment of a system in accordance with the present disclosure; and FIG. 2 is a high level block diagram of another embodiment of the present disclosure which makes use of elongated tubes of the plug which extend a significant distance within the interior volume of the pressure vessel to enhance convective effects that the system provides and to thus further reduce the overall time required to sufficiently pressurize the vessel.

DETAILED DESCRIPTION

Example embodiments will now be described more fully with reference to the accompanying drawings.

The present disclosure is directed to systems and methods which enable LH2 pressurization in an efficient and cost effective manner. The systems and methods of the present disclosure require no moving fluid except H2, which can be efficiently integrated into existing high pressure cylinder geometries (i.e., even through a narrow vessel neck), which do not require electrical nor combustion heating, and which can be made of, for example, Aluminum and/or stainless steel, or other suitable materials. In addition, the systems and methods described herein are low maintenance and have negligible operating costs. It should be noted that while the systems and methods described herein do not require an additional source of heat, if a heat source is available and can be used to increase the ambient temperature around the heat exchanger, certain design features of the system will benefit, such as the size of the heat exchanger.

Referring to FIG. 1, a system 10 in accordance with one embodiment of the present disclosure is shown. The system 10 includes an insulated pressure vessel 12 (hereinafter simply "pressure vessel 12"), which is connected to an ambient air high-pressure vaporizer 14 (hereinafter simply "vaporizer" 14) through a fill/discharge plug 16 (hereinafter simply "plug" 16). The plug 16 is coupled to a neck portion 18 on the pressure vessel 12. The neck portion 18 may be secured to the pressure vessel 12, or possibly integrally formed with the pressure vessel 12 during its manufacture. The vaporizer 14 may be a conventional, commercially available subsystem, such as is available from CEXI (Cryogenic Experts, Inc. of Oxnard, CA, or Cryoquip LLC of Murrieta, CA).

The plug 16 may include two orifices, one inlet orifice 20 which is for filling and the other discharge orifice 22 which is for discharge. The plug 16 may have a bi-metallic construction, if the pipes and the liner of the pressure vessel 12 are not of the same material, i.e., steel and Al for example. A bi-metallic plug suitable for use with the present system 10 for this application is disclosed in US patent publication 2014/0263358 A1, assigned to Lawrence Livermore National Security, and hereby incorporated by reference into the present disclosure. The pressure vessel 12 may be of conventional construction including an inner liner 12a separated from an outer wall 12b of the pressure vessel 12 by a vacuum space 12c, and wherein the inlet orifice 20 and the discharge orifice 22 both communicate with an interior volume 12d defined within the liner 12a. An optional heat source 24 may be included to heat the H2 flowing through the vaporizer 14, as will be described further in the following paragraphs.

With further reference to FIG. 1, the system 10 may also incorporate first and second conventional flow valves 26 and 28, respectively. The first flow valve 26 may be located in a discharge tube 30 which is coupled to the discharge orifice 22. The second flow valve 28 is located in a supply tube 32 which is coupled to inlet orifice 20. Supply tube 32 is coupled at one end to a discharge outlet 34 of the vaporizer 14, while the discharge tube 30 is coupled to an inlet 36 of the vaporizer 14. In this manner heated H2 may flow in a closed loop between vaporizer 14 and the pressure vessel 12 through the tubes 30 and 32, and through both flow valves 26 and 28. Both of the flow valves 26 and 28 may optionally include a manually engageable valve element 26a and 28a, respectively, which enables its associated valve to be fully closed, to thus completely block flow therethrough.

The system 10 may further incorporate a third flow valve 38 which communicates with the discharge tube 30 and a fourth flow valve 40 which communicates with the supply tube 32. The third and fourth flow valves 38 and 40 may likewise each include a manually engageable valve element 38a and 40a, which fully closes its associated valve to completely block flow therethrough.

The fourth flow valve 40 may further be in communication with a liquid H2 source 42 (not part of the system 10) which may be used to initially provide liquid H2 to fill the pressure vessel 12. During such filling, both the third and fourth flow valves 38 and 40, respectively, may be fully opened using their respective valve elements 38a and 40a. During this fill cycle, the first and second flow valves 26 and 28 may be fully closed, using their respective valve elements 26a and 28a, to block all flow therethrough. This ensures that liquid H2 will only flow into the pressure vessel 12 during its initial fill cycle.

Once the pressure vessel 12 is sufficiently filled with liquid H2, both of the third and fourth flow valves 38 and 40 may be closed using their respective valve elements 38a and 40a, and the first and second flow valves may then be fully opened using their respective valve elements 26a and 28a. This allows a pressurization cycle to be started by forming a closed loop flow path through the interior volume 12d of the pressure vessel 12, through the supply tube 32, through the discharge tube 30, through the first and second flow valves 26 and 28, and through an interior area of the vaporizer 14 via its inlet 36 and its discharge outlet 34. During the pressurization cycle ambient air is used to heat the liquid H2 circulating through the vaporizer 14. This increase in temperature of the liquid H2 results in an increase in pressure of the liquid H2. The temperature increase reduces the density and therefore creates convection by density gradient with the rest of the H2, thus promoting mixing and overall temperature increase of the H2. As the temperature increases, so does the pressure of the H2 within the pressure vessel 12.

As noted above, to further accelerate the pressurization of the H2, the optional heat source 24 may be used to provide heat to the H2 flowing through the vaporizer 14. The optional heat source may be an electrical heater (such as made by Elmess-Thermosystemtechnik GmbH & Co., of Uelzen, Germany). This may be helpful in certain regions, or during winter months in certain regions, when the ambient temperature may be quite low, for example below freezing. Including the optional heat source 24 may also allow the size and/or capacity of the vaporizer 14 to be decreased.

A significant advantage of the system 10 is that in many instances, the vaporizer 14, by itself without any external heat source, may be used to help pressurize the H2 within the pressure vessel 12. No modifications to the pressure vessel 12 are needed. No electrical or combustion heating is required, thus dramatically increasing safety when pressurizing H2 pressure vessels. The system 10 also has low maintenance and can be implemented without requiring significant site modifications or infrastructure modifications at LH2 filling locations. The system 10 may optionally incorporate a vent valve 44 with its own manually engageable valve element 44a as a pressure relieving option.

Referring to FIG. 2, a system 10' in accordance with another embodiment of the present disclosure is shown. The system 10' is similar to the system 10 in its construction and operation, and for that reason components in common have been labelled with the reference numbers used to describe the system 10. The difference with the system 10' is that the discharge tube 30 includes a length portion 30a which extends inside the pressure vessel 12, and may be shaped in a manner to extend in a curving orientation toward an upper area of the pressure vessel when the pressure vessel is orientated in a horizontal position as shown in FIG. 2. Similarly, the supply tube 32 includes a length portion 32a which extends inside the pressure vessel 12, and which may be shaped to extend in a curving path downwardly to a point adjacent a lower area of the pressure vessel, when the pressure vessel is orientated as shown in FIG. 2. The length portions 30a and 32a even further increase the efficiency of convective effects in warming the H2 flowing between the pressure vessel 12 and the vaporizer 14, and thus further help to reduce the time it takes to fully pressurize the pressure vessel. Check valve 46 may also installed in the discharge tube 30 to force the flow such that H2 flows into the length portion 30a and out from the length portion 32a, thus ensuring that warmed fluid coming from the vaporizer 14 is deposited in the colder H2 at the bottom of the pressure vessel 12, causing even better mixing within the pressure vessel 12.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A system for pressurizing liquid hydrogen (LH2), comprising:
a pressure vessel for containing an initial quantity of the LH2, the pressure vessel containing a neck portion;

a fill/discharge plug having an inlet orifice and an outlet orifice, and coupled to the neck portion of the pressure vessel to communicate with an interior area of the pressure vessel;

a vaporizer having an inlet and an outlet;

a discharge tube coupling the outlet orifice of the fill/discharge plug with the inlet of the vaporizer;

a vent valve disposed in communication with the discharge tube at a point between the outlet orifice of the fill/discharge plug and the inlet of the vaporizer;

a supply tube coupling the outlet of the vaporizer with the inlet orifice of the fill/discharge plug, and a portion of the supply tube extending inside the pressure vessel and angled to a point adjacent a bottom portion of an interior area of the pressure vessel;

the vaporizer receiving a portion of the LH2 from the pressure vessel via the discharge tube during a pressurization operation, warming the portion of the LH2 using an ambient environment, and discharging heated and pressurized H2 back to the pressure vessel through the supply tube;

the vent valve providing a path to atmosphere during an LH2 fill operation in which the pressure vessel is being filled from an external LH2 source with the LH2, and the vent valve being configurable in a closed condition during the pressurization operation;

a one-way flow valve in the discharge tube, for limiting a direction of flow of the portion of the LH2 to be only from the pressure vessel into the vaporizer during the pressurization operation, wherein the discharge tube includes a length portion extending inside the pressure vessel and angled upwardly to a point adjacent an upper interior area of the pressure vessel, and the pressure vessel is oriented in a horizontal orientation.

2. The system of claim 1, wherein the vaporizer comprises an ambient air pressure vaporizer.

3. The system of claim 1, further comprising a first valve disposed in communication with the discharge tube for controlling the flow of the portion of the LH2 between the outlet orifice of the pressure vessel and the inlet of the vaporizer, and for enabling blocking a flow of the LH2 into the vaporizer during a LH2 fill operation.

4. The system of claim 3, further comprising a second valve disposed in communication with the supply tube for controlling a flow of the LH2 between the outlet of the vaporizer and the inlet orifice of the pressure vessel.

5. The system of claim 4, further comprising an additional valve in communication with the supply tube for enabling the LH2 from an external LH2 source to be communicated into the pressure vessel.

6. The system of claim 1, further comprising an external heat source for heating the vaporizer.

* * * * *